July 7, 1931. E. G. TEMPLETON ET AL 1,813,869
FLAP CUTTING DEVICE
Filed June 10, 1925   7 Sheets-Sheet 2

INVENTORS
Edwin G. Templeton,
William K. Glennon,
BY
ATTORNEY

July 7, 1931. E. G. TEMPLETON ET AL 1,813,869
FLAP CUTTING DEVICE
Filed June 10, 1925 7 Sheets-Sheet 3
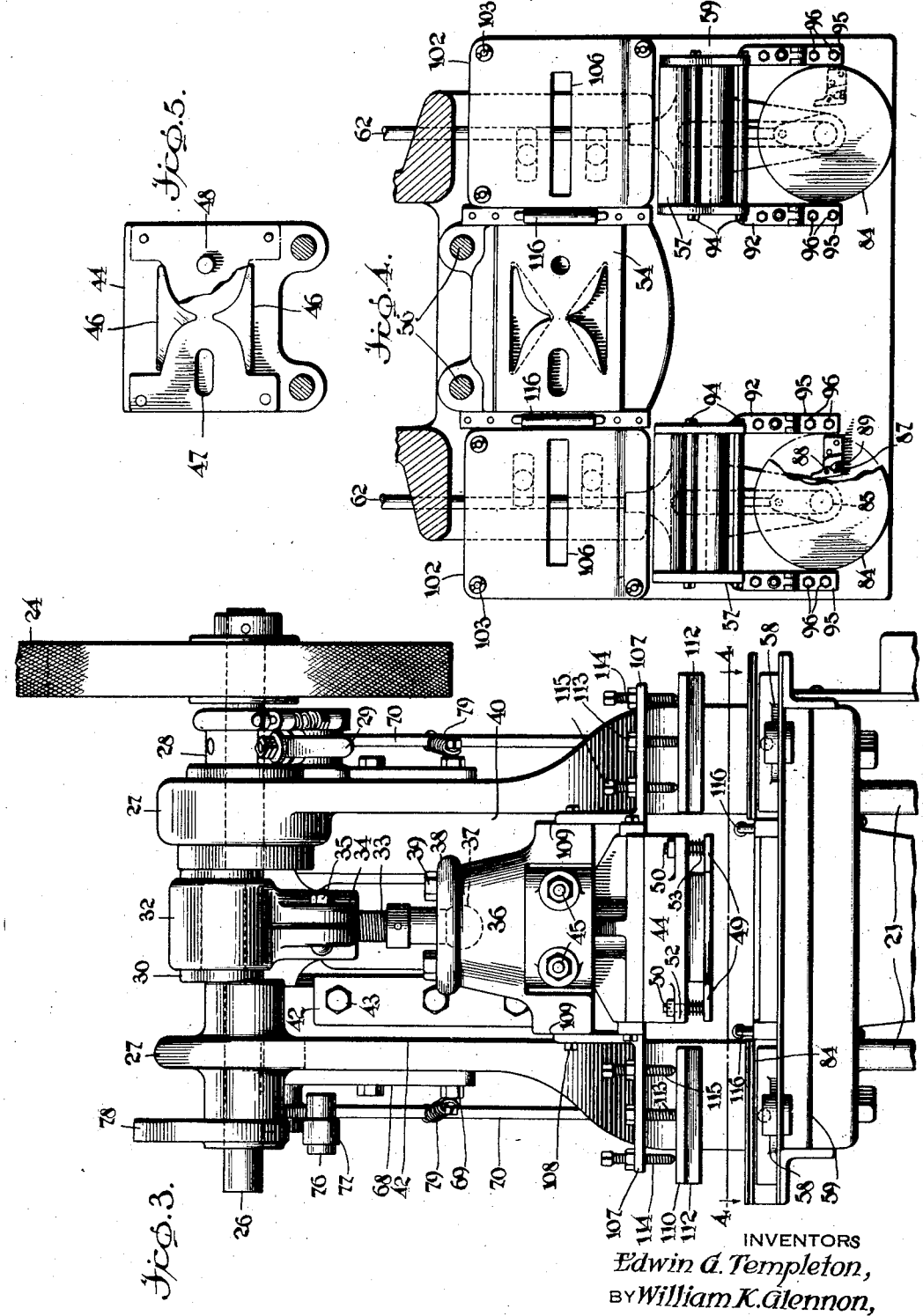
INVENTORS
*Edwin G. Templeton,*
BY *William K. Glennon,*
ATTORNEY July 7, 1931.  E. G. TEMPLETON ET AL  1,813,869
FLAP CUTTING DEVICE
Filed June 10, 1925    7 Sheets-Sheet 4
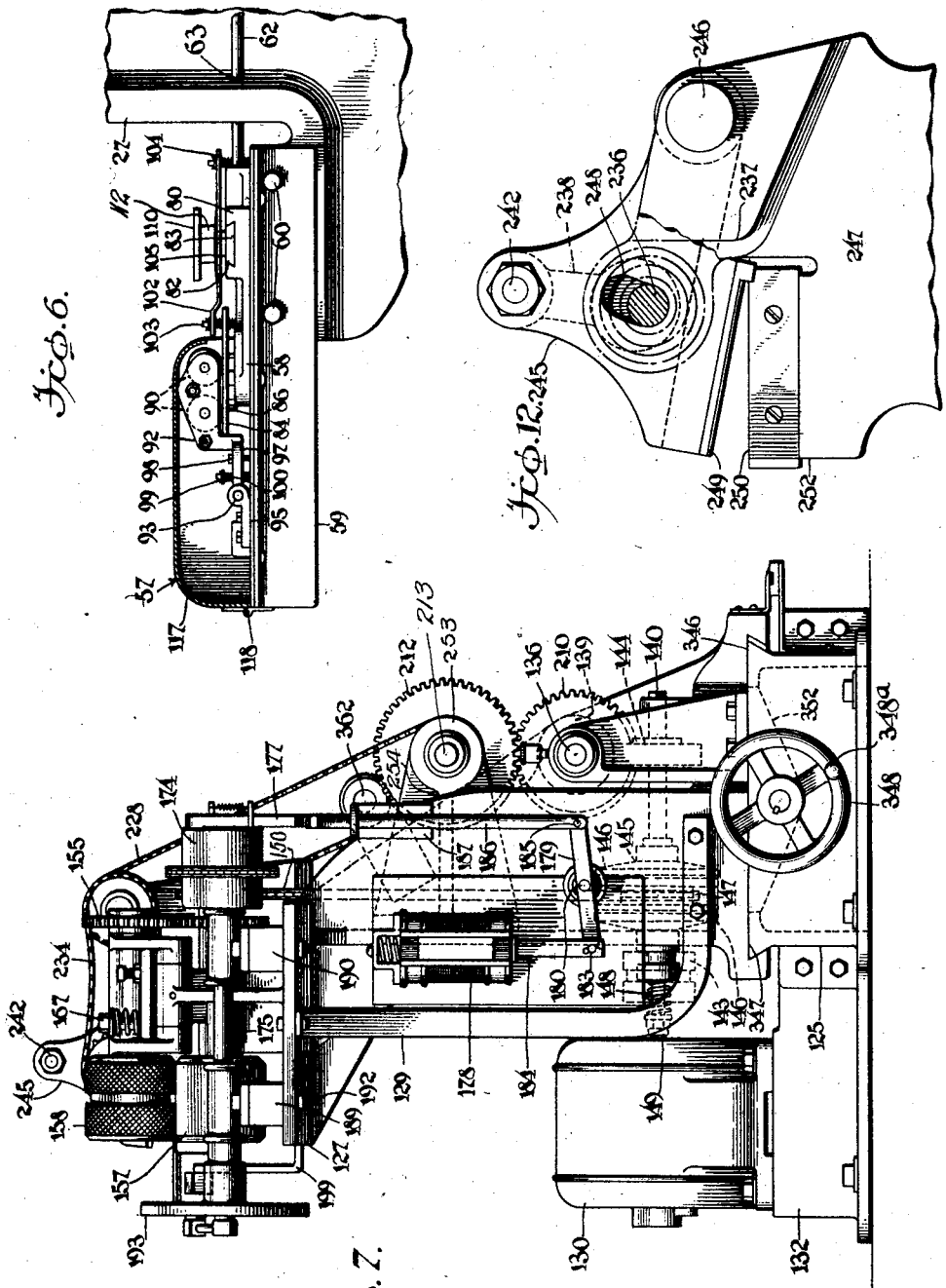
INVENTORS
Edwin G. Templeton,
William K. Glennon,
BY
ATTORNEY

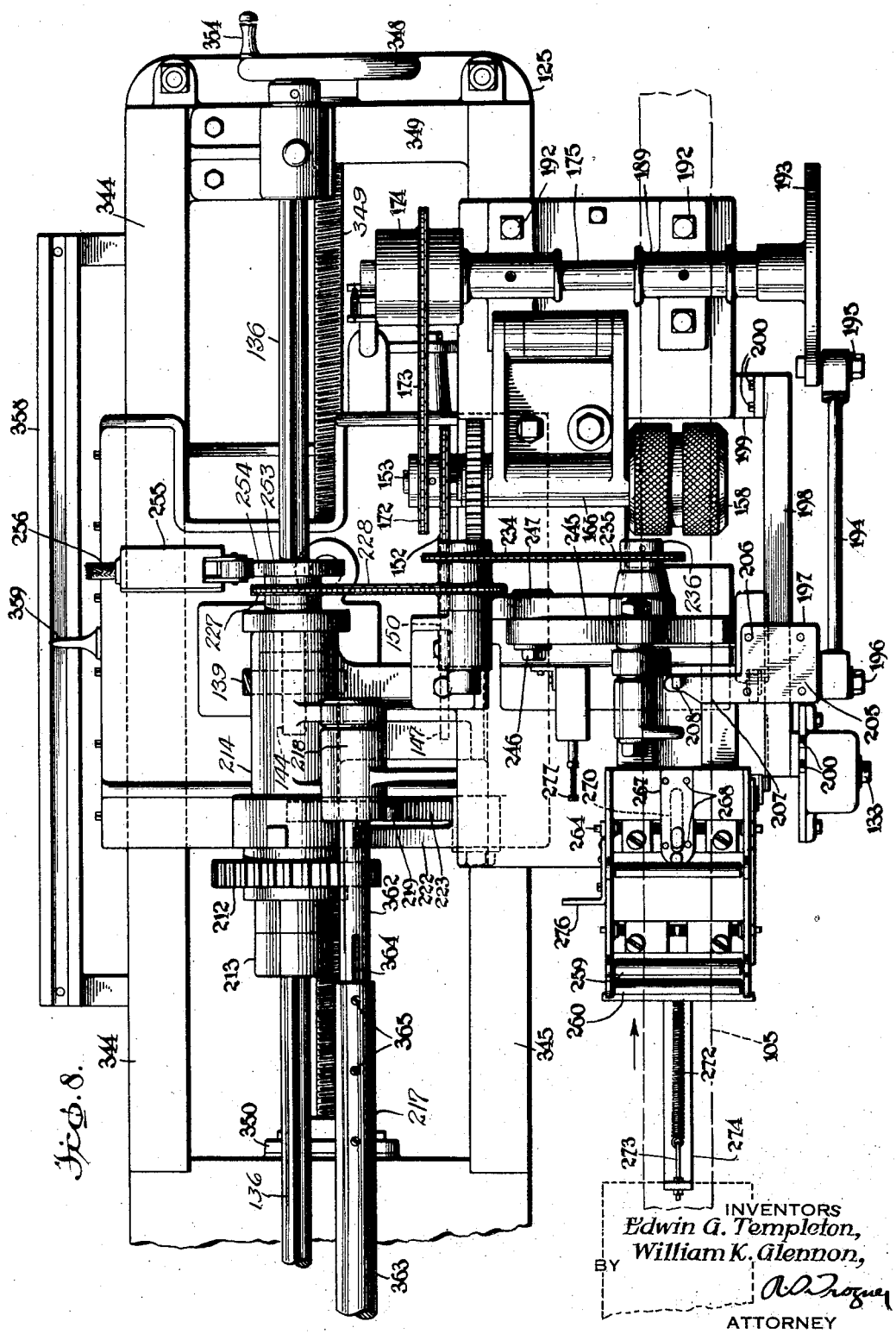

July 7, 1931.   E. G. TEMPLETON ET AL   1,813,869
FLAP CUTTING DEVICE
Filed June 10, 1925   7 Sheets-Sheet 6
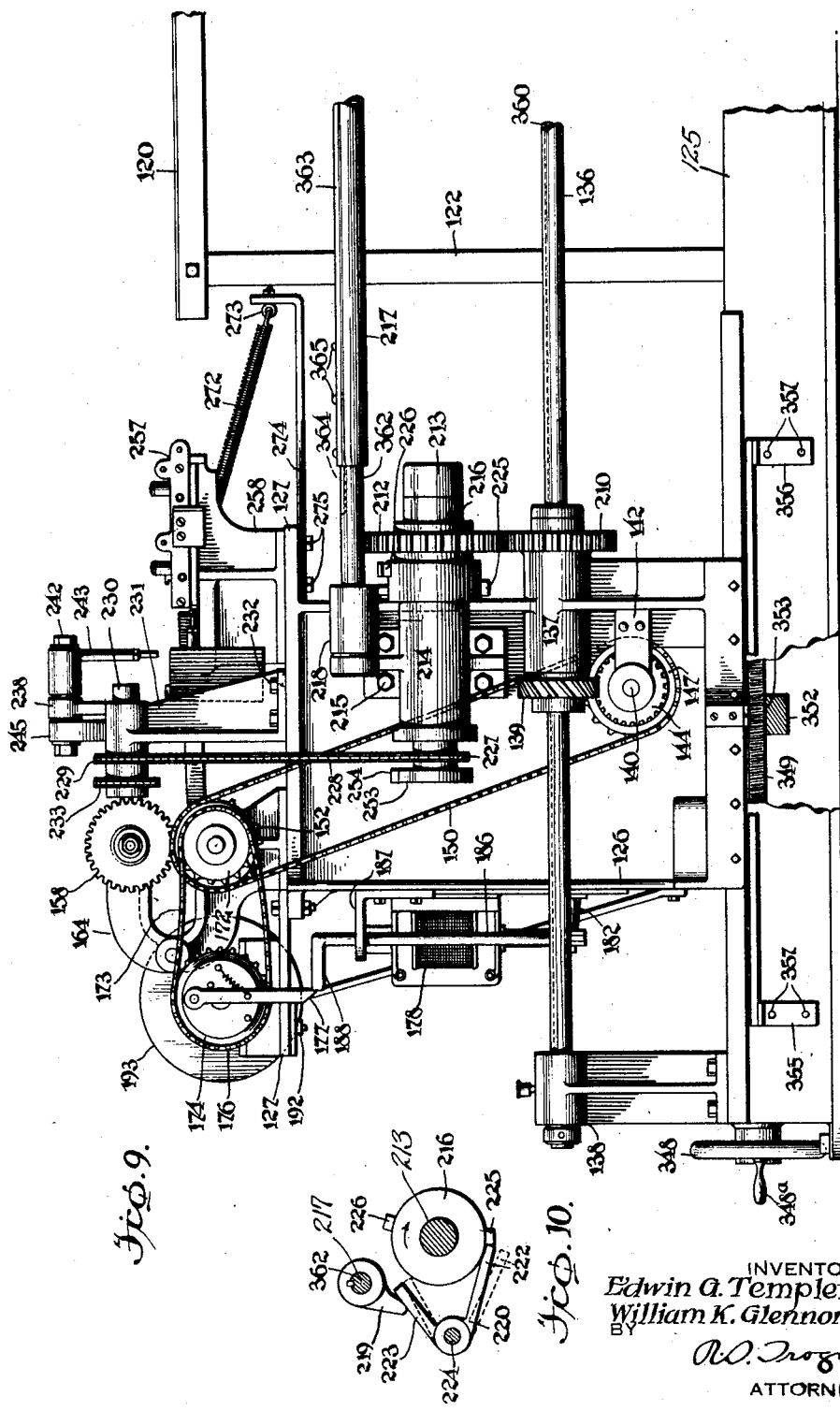
INVENTORS
Edwin G. Templeton,
William K. Glennon,
BY
ATTORNEY

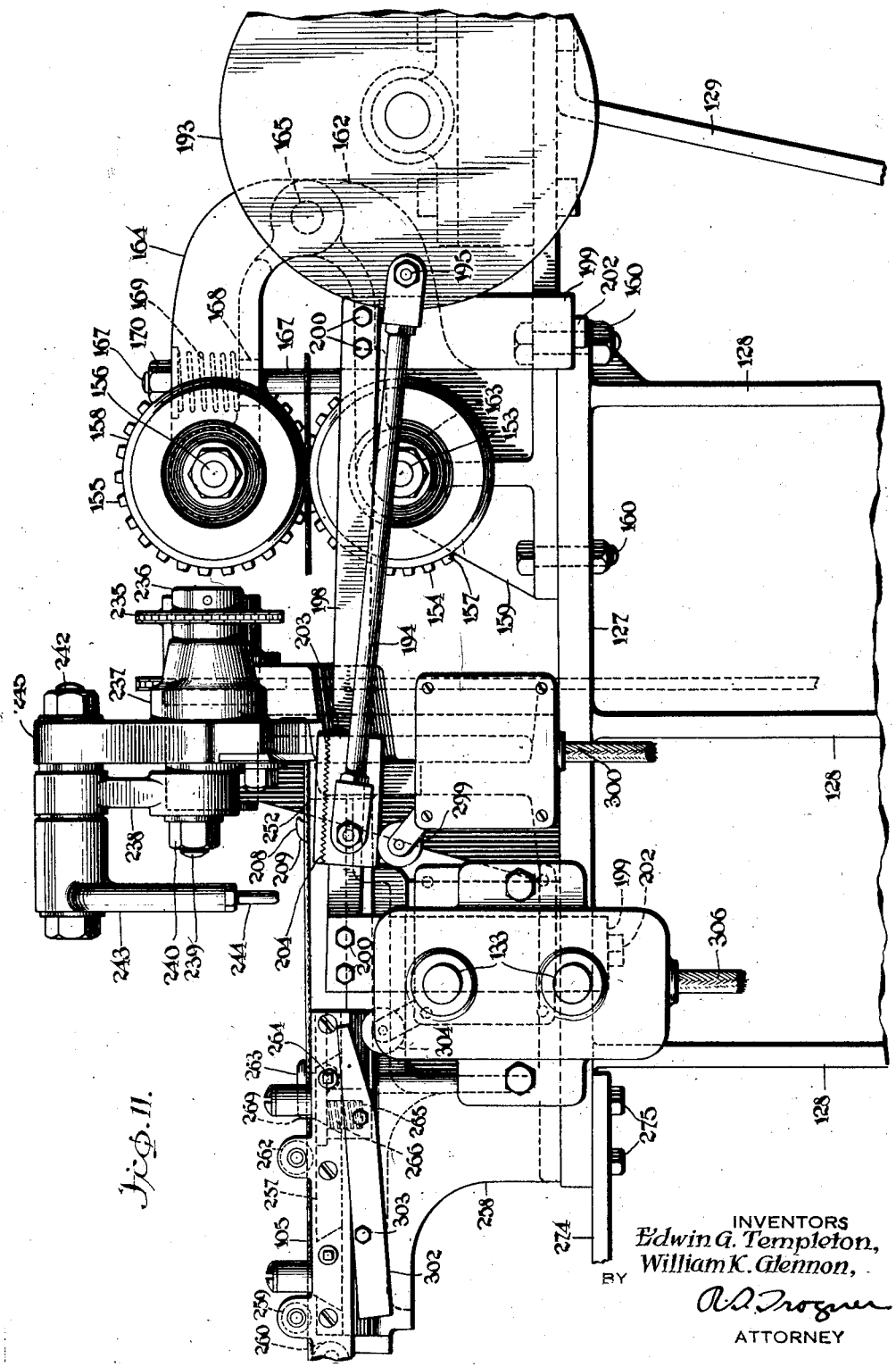

Patented July 7, 1931

1,813,869

UNITED STATES PATENT OFFICE

EDWIN G. TEMPLETON AND WILLIAM K. GLENNON, OF AKRON, OHIO, ASSIGNORS TO THE GOODYEAR TIRE & RUBBER COMPANY, OF AKRON, OHIO, A CORPORATION OF OHIO

FLAP CUTTING DEVICE

Application filed June 10, 1925. Serial No. 36,145.

Our invention relates to machines employed in cutting flexible material into uniform lengths and it has particular reference to a machine adapted to be operated automatically to prepare automobile tire flaps to be utilized in all sizes of tires.

One object of our invention is to provide a machine which will produce from a roll of flexible material uniformly measured strips cut in any desired length.

Another object of our invention is to provide a machine adapted to print or stamp directions or advertising matter upon tire flaps as they are being finished.

Another object of our invention is to provide a machine having its parts so inter-related that it is only necessary to place a strip of material in operative position and start the operation of the machine to secure continuous output of finished tire flaps automatically.

Still another object of our invention is to provide an electrically controlled machine which will perform the function of producing tire flaps with minimum expenditure of time and labor.

Material employed in the manufacture of automobile tire flaps is commonly made of fabric, rubberized fabric or similar material. The material is prepared in long strips and rolled upon suitable reels before the finished flaps are cut therefrom and stamped.

Prior to our invention, so far as we are aware, flaps of the above designated character were punched and sheared by means of well known punch-presses. The method generally employed for punching the flap included shearing the edges of the strip toward its center line, leaving a relatively narrow portion of the strip which was later severed with shears by a workman. Each flap required a separate manual operation for cutting and measuring it, and the stamping operation, likewise was accomplished manually with the aid of a conventional rubber stamp. It will readily be seen that the manufacture of flaps by this method entailed a considerable amount of manual labor and involved a number of time consuming steps.

A machine embodying the principles of our invention will eliminate the disadvantages common to the manner of manufacturing flaps as heretofore practiced. Only one operator is required to attend the machine to maintain a supply of flap rolls and place them in proper position to be finished by the machine. Speed of production is materially increased, expenses reduced and the uniformity of the finished product improved to a marked degree.

In obtaining the results above mentioned and other advantages that will be apparent as the description proceeds, we have disclosed several features of invention including a punch-press provided with novel improvements and additions in the form of stamping or printing devices which will operate in synchronism with the punch against a tire flap in the course of the latter's travel through the machine. An overhead power supply having the usual connections drives the punch-press and the latter is provided with a trip lever and clutches adapted to control rotation of a cam shaft secured to the punch. Each time the lever and clutch are tripped only one revolution of this shaft is permitted and thus causes one cycle of operation of the punch and printing mechanism.

At one side of the punch, we have attached a cutting mechanism which is driven by a suitable motor and is so interconnected to the punch by conventional electrical devices that it operates in conjunction with and controls the operation of the punch after the machine has been started. The cutting mechanism is provided with take-away rollers serving the purpose of drawing the strip forwardly through the machine. Operation of the cutting mechanism is controlled by electrical connections whose operation is begun by a sliding carriage formed with a lug thereon. The lug is adapted to engage a punched opening or slot in the strip as it travels through the machine, the force of the traveling strip moving the carriage forward to complete an electric circuit. This movement begins operation of the remainder of the cutting mechanism including a knife for severing the strip at pre-determined intervals to provide uniform lengths of the finished flaps. As soon as the strip is severed, the carriage automatically moves back to its normal position.

Operation of a feed slide is automatically controlled by electrical connections to engage the slot in the strip as the lug on the carriage disengages it and carry the strip forwardly between the rollers to continue drawing the strip through the machine.

As the flap material is fed from the roll into the machine, it passes between a pair of tension rollers which are electrically controlled in such manner that the rollers grip the strip temporarily and are rotated in the direction of travel of the strip, against the force of a weight which is suspended from a disc operatively connected to one of the rollers. This action occurs while the carriage moves forwardly and is for the purpose of temporarily tensioning the strip to prevent wrinkling or contraction thereof. As soon as the strip is severed, the tension rollers release their grip and the strip is automatically drawn through the machine while the successive cycles of operation are performed until a supply of material is exhausted.

Solenoids and switches which are included in a conventional electrical control system are so arranged that they are automatically operated by a series of clutches and sprocket gearing after the machine is once started. Separate push buttons are conveniently located for the purpose of effecting energization or de-energization of the motor. Three automatically operated switches are provided, one operated by the carriage of the cutting mechanism to actuate the tension rollers while the strip is being severed, a second also operated by the carriage to trip a clutch mechanism, and a third, operated by a gearing member after the cutting mechanism has started, for moving the severed end of the strip into contact with the take-away rollers to continue operation. One cycle of operation is thus completed and continuous repetition thereof is secured automatically, without stopping the machine until a roll of material has been exhausted.

For a better understanding of our invention, reference may now be had to the accompanying drawings forming a part of this specification in which;

Fig. 3 is a fragmentary view, on a larger scale, of the punch press illustrating details of construction;

Fig. 4 is a fragmentary sectional view taken substantially on the line 4—4 of Fig. 3;

Fig. 5 is a detail view of a punch employed in the punch press;

Fig. 6 is a detail view illustrating a stamping and printing mechanism attached to the punch press;

Fig. 7 is an elevational view of one end of our machine illustrating the cutting mechanism;

Fig. 8 is a plan view of the cutting mechanism;

Fig. 9 is a side elevational view of the cutting mechanism illustrating connections to the motor;

Fig. 10 is a detail view of one of the clutch mechanisms;

Fig. 11 is a detail view, on a larger scale, illustrating the cutting mechanism; and Fig. 12 is a detail fragmentary view, on a larger scale, illustrating the knife employed in our machine.

Figure 1:
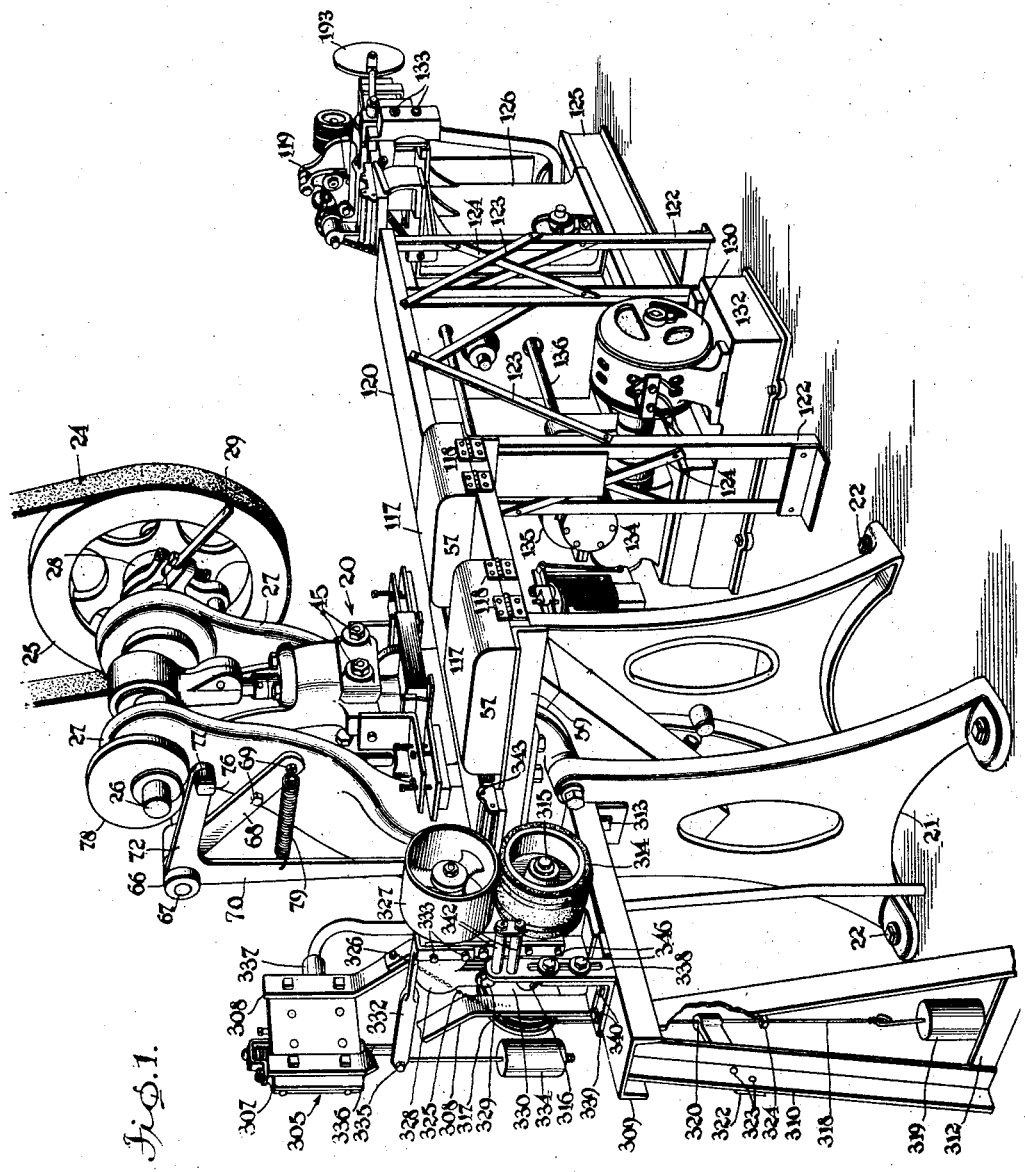
Fig. 1 is a perspective view of a machine embodying the principles of our invention.

In practicing our invention, we have provided a punch press 20 provided with supporting members 21 secured to a suitable foundation or floor by means of nuts and bolts 22. A conventional over-head power supply (not shown), controlled by push buttons 23, drives a belt 24 which is trained about a wheel 25 and adapted to drive an eccentric crank shaft 26 journalled adjacent its ends to upright supporting members 27, which are integral with the main portion of the punch press. A conventional trip clutch 28 connected to the wheel 25 and the crank shaft, may be tripped by manually actuating a lever arm 29.

An eccentric bearing 30 is formed upon the crank shaft and operates an elongate bearing member 32, the latter being connected to an adjustable rod 33. One end of the rod 33 is threaded to a split portion 34 of the bearing member and secured firmly in place by a bolt 35. The other end of the rod is connected to a vertically slidable member 36 through the medium of a ball and socket joint 37. A cap 38 provided with securing bolts 39 retains the end of the rod in the slidable member 36. As the crank shaft is rotated, the slidable member is guided vertically in the supports 27 which are provided with guides 40. A removable plate 42 secured by means of bolts 43 forms a part of the guide means.

A punch head 44 is secured to the slidable member by means of bolts 45 and is adapted to reciprocate vertically therewith. The face of the punch head is formed with raised portions 46, 47 and 48 whose contours indicate the form parts of the flap will assume when punched. At each side of the punch head 44, a shield or guard 49 is secured by means of bolts 50 extending slidably through flanges 52 of the punch head. Small coil springs 53 disposed about the bolts maintain the shields normally spaced from the flanges. A die 54 cooperating with the punch head is rigidly secured to the supporting members 21 of the punch press. Bolts 56 hold the die rigidly in place upon the supporting members of the punch press. The punch press just described is of the conventional type and does not form a part of our invention.

Operating in conjunction with the punch press, as best shown in Figs. 4 and 6, we have provided novel printing or stamping mechanisms 57 which are operated in synchronism with the punch. These mechanisms are identical and consist of sliding plates 58 which are adapted to reciprocate upon a platform 59 secured to the supports 21 in any conventional manner, for example, by means of bolts and nuts 60. The sliding plates 58 are connected to rods 62 extending rearwardly through the upright members 27, as indicated at 63, and are guided within hollow members 64 bolted to the punch press by means of nuts and bolts 65.

Actuation of the printing mechanism is effected by movement of a bell-crank lever mechanism 66 including a horizontal rod 67 keyed thereto and journalled in brackets 68. These brackets are secured to the punch press by means of bolts 69. The lever mechanism is formed with two downwardly extending arms 70 and an arm 72 disposed substantially horizontal. At the lower ends of the arms 70, links 73 are secured at one end to a pin 74 and at the other end to a pin 75. The other or upper arm 72 of the lever mechanism carries a pin 76 upon which a roller 77 is journalled. This roller is adapted to contact a cam 78 keyed to the crank shaft 26.

It will be seen from this construction that actuation of the ends of the lever mechanism pivoted to the links 73 causes the sliding plates 58 to reciprocate upon the support 59 each time the crank shaft is rotated. Approximately 80 degrees of the surface of the cam engaging the roller 77 is approximately of the same radial distance from the axis of the shaft 26. The cam will therefore actuate the lever to predetermined position, permit it to remain in that position momentarily, and then permit it to return to its normal position. In order to return the lever to normal position after actuation by the cam, a spring 79 is connected to the lever at one end and at the other end to one of the bolts 69 which secures the bracket 68 to the punch press.

It will be noted by reference to Figs. 4 and 6 that each of the sliding plates 58 of the printing mechanism is provided with a type holder 80 which is adapted to carry a type bar 82 fitting into a slot 83. At one extremity of the sliding plate a platen or inking disc 84 is mounted for rotation upon a bolt 85, the bolt being keyed to the disc and also to a ratchet wheel 86. When the sliding plate 58 is reciprocated, one of the teeth of the ratchet wheel strikes a pawl 87 which is pivoted upon a pin 88 and is held in proper position by a spring 89. When the tooth of the ratchet 86 engages the pawl, the disc is rotated.

A plurality of rollers 90 are journalled upon pivoted holders 92 which are secured upon pivot pins 93 upon opposite sides of the sliding plate and reinforced by cross bolts 94. Brackets 95 are secured to the support by means of nuts and bolts 96. The holder 92 is provided with angular portions 97 in which adjustable bolts 98 are threaded, acting as set screws against the upper surface of the support 59. Secondary bolts 99 loosely fit through openings in the angular portions and are threaded into the support 59. In order to yieldingly resist upward movement of the holder 92, small springs 100 surround the bolts 99 between the angular portion and the head of the bolt.

It will be apparent from this construction that the rollers 90 are so positioned that they engage the inking plates 84 as they are rotated and the ink is thereby distributed evenly over the rolls and plates. The sliding plates 58 move toward the pawls a sufficient distance for the type bars to be engaged by the inking rollers and supplied with ink during each revolution of the crank shaft 26.

Guard plates 102 of thin metal are vertically slidable upon bolts 103 which are secured to the support 59 and provided with springs 104 upon which the guards rest. These plates are for the purpose of providing smooth supports for tire flap material indicated at 105. The material travels over the guard and over slots 106 which permit the type to extend through the plate to engage the strip when pressure is applied thereto. This pressure is applied to the strip by means of brackets 107 bolted to the punching member by means of nuts and bolts 108. Part of the punching member is cut away, as indicated at 109, forming abutments to prevent displacement of the brackets 107. The brackets 107 are provided with plates 110 upon which are secured pads 112 made of rubber or other yieldable material. The plates 110 are connected to the brackets by means of bolts 113 which are screw threaded in the brackets and secured firmly to the plate. Additional bolts 114 and 115 are threaded into the bracket and operate as set screws against the top of the plates to adjust the latter with respect to the brackets and to maintain the brackets and plates rigidly in adjusted position.

It will be seen from this description that the pads 112 are moved downwardly together with the punch member and the flap material is engaged between the pads and the type bars. The cam member on the crank shaft 26 operates the printing mechanisms in such manner that the sliding plates together with the type bars are temporarily at rest in the position shown in Fig. 6. The punch member and the pads and brackets move downwardly together against the flap material thereby punching and stamping the material simultaneously.

The flap is guided in its travel over the guard plates by means of rollers 116 which are secured in any suitable manner to the support 59. The printing mechanism is protected from dust by means of covers 117 provided with hinges 118 secured to the cover and to the support 59.

A cutter mechanism, generally indicated by the numeral 119, is spaced from the punch press, a table 120 being disposed between the press and the cutting mechanism to prevent the flap from sagging as it is suspended between these two members. The table is provided with supporting legs 122 which are braced in a conventional manner by means of cross members 123 and 124. The cutting mechanism is carried upon a base member 125 secured to the floor or foundation in any suitable manner. Operating parts of the cutting mechanism are supported upon a frame work 126 provided with a platform or top 127 and reinforcing members 128 and 129.

For the purpose of supplying a suitable power supply for operating the cutting mechanism, we have provided an electric motor 130 mounted upon a suitable base member 132 which is disposed adjacent base member 125 or may be formed as a part thereof. Energization of the motor is controlled by push buttons 133 and it is provided with the usual reducing gears which are inclosed in the housings 134 and 135. These gearings are of standard type and do not require detailed description.

A shaft 136 driven by the motor is journalled upon the frame 126 in journal bearings 137 and 138 and supports a gear wheel 139 keyed thereto. Adjacent the shaft 136 a second shaft 140 mounted in journal bearing brackets 142 and 143 (Figs. 7 and 9) is provided with a gear wheel 144 intermeshing with the gear wheel 139.

Adjacent one end of the shaft 140 we have provided a slip clutch 145 (Figs. 7 and 9) including friction discs 146 rigidly secured to the shaft and a sprocket wheel 147 loosely mounted upon the shaft which is provided with suitable plane surfaces for engaging the friction discs, the frictional resistance between the discs and sprocket wheel being regulated by a spring 148 surrounding one end of the shaft and held thereupon by means of an adjustable nut 149. The disc 146, on the end of the shaft adjacent the spring 148, is slidable longitudinally of the shaft 140 under the influence of the aforesaid spring. The frictional resistance of the slip clutch is so regulated by adjusting the tension of the spring 148 that the sprocket wheel 147 will cease to rotate with the shaft when a predetermined opposing force is applied thereto. A sprocket chain 150 is trained over the sprocket wheel 147 and over a second sprocket wheel 152 carried rigidly upon a horizontal shaft 153.

A gear wheel 154 is also keyed to the shaft and is adapted to intermesh with a gear wheel 155, rigidly secured to a shaft 156. Two take-away rollers 157 and 158 are keyed respectively to the shafts 153 and 156 and are adapted to cooperate with each other to engage the flap and draw it through the machine. A bearing support 159 is rigidly secured to the top 127 of the frame for the cutting mechanism by means of bolts 160 and is provided with a projection 162 and a journal bearing 163 on which the shaft 153 is adapted to rotate. A hinge member 164 is pivotally connected at one extremity to the projection upon a pivot pin 165 and at the other extremity is provided with a bearing 166 in which the shaft 156 rotates. In order that the rollers may so grip the flap that it will not slip, a rod 167 is secured to the support and extends upwardly and loosely through an opening 168 in the hinge member. A spring 169 is disposed about the upper portion of the rod and maintained thereon by means of a nut 170 which is adapted to adjust the tension of the spring, to yieldingly press the flap material between the rollers.

A second sprocket wheel 172 is keyed to the shaft 153 and is provided with a chain 173 which drives a clutch member 174. The clutch member is secured to a shaft 175 and is provided with sprocket teeth 176 for engagement with the chain. This clutch member, which is provided with a trip arm 177, is of a well known type adapted to make one revolution, each time the trip arm is released. The release is made possible by operation of a solenoid 178 which is connected to a lever 179, intermediately pivoted at 180 upon a bracket 182 carried by the frame 126. One end of the lever 179 is pivoted at 183 to the lower end of an actuating core 184 of the solenoid and the other end is pivoted at 185 to the lower end of a bar 186. The upper portion of the bar 186 is slidable through a bracket 187 secured to the frame, the extreme end being bent to form an angular portion 188 adapted to engage the trip arm 177. When the solenoid is energized, the bar 186 is moved suddenly downwardly and the clutch and shaft is permitted to make one revolution, the trip arm being stopped against the angular portion 188 at the completion of one revolution.

Suitable bearing brackets 189 and 190 for the shaft 175 are secured in the usual manner by means of bolts and nuts 192, to the top of the frame of the cutting mechanism. At one end of the shaft opposite the location of the clutch, a disc 193 is rigidly secured. A connecting rod 194 is secured at one end to a bolt 195 fastened near the circumference of the disc and at the other end is secured to a bolt 196, the latter being rigidly secured to a feed slide 197. A suitable guide bar 198 is bolted at opposite ends upon two identical brackets 199 by means of bolts 200, the brackets being secured by means of bolts 202 to the frame of the cutting mechanism. When the disc is rotated the slide travels over the smooth surface of the guide bar. The feed slide comprises an angular plate 203 which practically surrounds and slides upon the guide. This slide is formed with an upper serrated edge as indicated at 204, which cooperates in interfitting relationship with a serrated portion of an upper plate 205 secured to the side plate 203 by means of bolts 206. A horizontally extending arm 207 integral with the plate 205 is formed with a lug 208 adapted to engage an opening in tire flap material in a manner presently to be described. To facilitate disengagement of the flap material, the rear end of the lug is bevelled, as indicated at 209.

Referring to Fig. 9, we have shown a gear wheel 210 keyed to the shaft 136 and adapted to intermesh with a gear 212 secured to a shaft 213 which is journalled in a bracket 214 secured to the frame 126. The usual bolts 215 are provided for securing the bracket to the frame. The clutch member 216 is connected to the shaft and operates in substantially the same manner as the clutch member 174, with the exception that the releasing mechanism is somewhat modified. In this case a rod 217 is journalled at one end in a bearing 218 carried by the frame and is provided with a rigid arm 219. As shown in Fig. 10, adjacent the clutch member, an angular lever 220 formed with offset arms 222 and 223 is pivoted upon a bolt 224 secured to a portion of the frame of the cutting mechanism. When the rod 217 is actuated a slight degree by electrical means, later described, the arm 219 engages the lever 220 and throws the end 222 downwardly out of contact with a lug 225 on the clutch. The clutch together with the shaft upon which it is mounted is turned one revolution and in the course of the revolution, a lug 226 engages the end 223 of the lever, thus throwing the other end of the lever again in the path of the lug 225 to stop rotation of the clutch and shaft. It will be noted from Fig. 9 that the lugs upon the clutch are offset laterally and also the arms of the lever are so offset that one of the lugs will engage only one of the arms of the lever.

A sprocket wheel 227 is keyed adjacent one end of the shaft and is provided with a sprocket chain 228 extending upwardly over a sprocket wheel 229, the latter being keyed to a shaft 230. This shaft is provided with a bearing bracket 231 bolted at 232 to the frame, and also carries a sprocket wheel 233 adapted to operate a sprocket chain 234 extending in a horizontal direction and supported upon a sprocket wheel 235, the latter being rigidly secured to an eccentric crank shaft 236. A suitable bearing 237 rigid with the frame of the cutting mechanism supports the eccentric shaft; one end of the shaft projects on one side of the bearing to support the sprocket gearing 235 and the other end projects on the other side of the bearing to support a link 238. This link is journalled to the eccentric part of the shaft which serves in effect as a short crank arm, indicated at 239 and is held in place by means of a nut 240 screwed upon the end of the shaft. The upper end of the link is provided with an opening serving as a bearing to receive a horizontal bearing bolt 242. At one side of the link is a downwardly extending arm 243 rigidly secured or keyed to the bolt and provided with a finger 244, these members being adapted to move upwardly and downwardly by actuation of the link as the eccentric shaft is rotated. At the other side of the link 238 a knife 245 is rigidly secured to an end of the bolt 242 and is pivoted at one end upon a bolt 246 mounted in a rigid bracket member 247 integral with the bearing 237. The knife 245 is provided with an elongate slot or opening 248 through which the eccentric shaft 236 extends, permitting vertical movement of the knife without interference from the eccentric shaft. At the lower edge of the knife, we have provided a cutting edge 249 which is adapted to cooperate with a sharp edge 250 secured to an abutment 252. This abutment may be formed as an integral part of the bracket member 247.

It will be noted from this construction that each time the shaft 236 is rotated one complete revolution, the cutting edges 249 and 250 are brought past each other in shearing relationship and the knife returned to normal position as shown in Fig. 12. The sprocket and chain gearing between the shaft 236 and the clutch 216 is so synchronized that with each revolution of the clutch together with the shaft 213, the eccentric shaft 236 will be turned one revolution.

It will also be noted, by reference to Fig. 9, that a disc 253 is keyed to the end of the shaft 213 and is provided with a lug 254. This lug is adapted to engage a switch 255, shown in Fig. 8, each time the shaft 213 is rotated. The switch 255 is secured in any convenient manner to the frame 126. From the position of the clutch and shaft 213, as illustrated in Fig. 9, the lug 254 will make slightly more than half a revolution before it engages the switch member 255. The switch 255 is connected by means of conventional wiring 256 to the solenoid 178, and each time the disc 253 is rotated, the bar 186 is moved downwardly releasing the arm 177 of the clutch to operate the feed slide 197.

The cutting mechanism includes a sliding carriage 257 which is mounted upon a track 258 rigidly secured to the top of the frame of the cutting mechanism. A plurality of rollers 259 and 260 are mounted at one end of the carirage and are adapted to guide the flap thereon. An additional roller 262 is mounted upon an intermediate portion of the carriage and is adapted to maintain the flap in close contact with the upper surface of the carriage. The direction of forward movement of the carriage is indicated by the arrow in Fig. 8.

Near the forward end of the carriage, a lug 263 is pivoted adjacent one end upon a pin 264 secured below the surface of the carriage. An opening 265 is provided in the carriage and is adapted to contain a spring 266 which bears against the rear end of the lug to normally maintain it in a horizontal position. A small plate 267 secured to the carriage by means of screws 268 is positioned over the opening and prevents the spring from being displaced. The rear end of the lug is formed with an abutment 269 which is adapted to engage a punched slot 270 in the flap, as the flap is drawn over the carriage. A spring 272 is connected to the carriage at one end and at the other end is secured to an eye-bolt 273, the latter being secured to the end of a bracket 274. The bracket is bolted to the frame by means of nuts and bolts 275. At one side of the carriage a bracket 276 rigidly secured to the carriage projects laterally therefrom and is adapted to engage a switch member 277 when the carriage is moved in a forward direction. The carriage is limited in its forward movement by the abutment 252 against which it is stopped immediately after the bracket engages the switch member 277.

By closing the switch 277, an electric circuit is completed which trips a solenoid 278 (Fig. 2) to actuate the rod 217, thus operating the clutch mechanism 216, in consequence of which the cutting edge 249 operated by the chains 228 and 234, severs the flap. While the knife 245 moves downwardly to sever the flap, the finger 244 engages the lug 263 adjacent its rear end pressing it downwardly until the flap is released therefrom. At the same time, the forward end of the slot 270 in the flap hooks over the lug 208. As soon as the flap is severed, the spring 272 retracts the cariage to its normal position.

Figure 2:
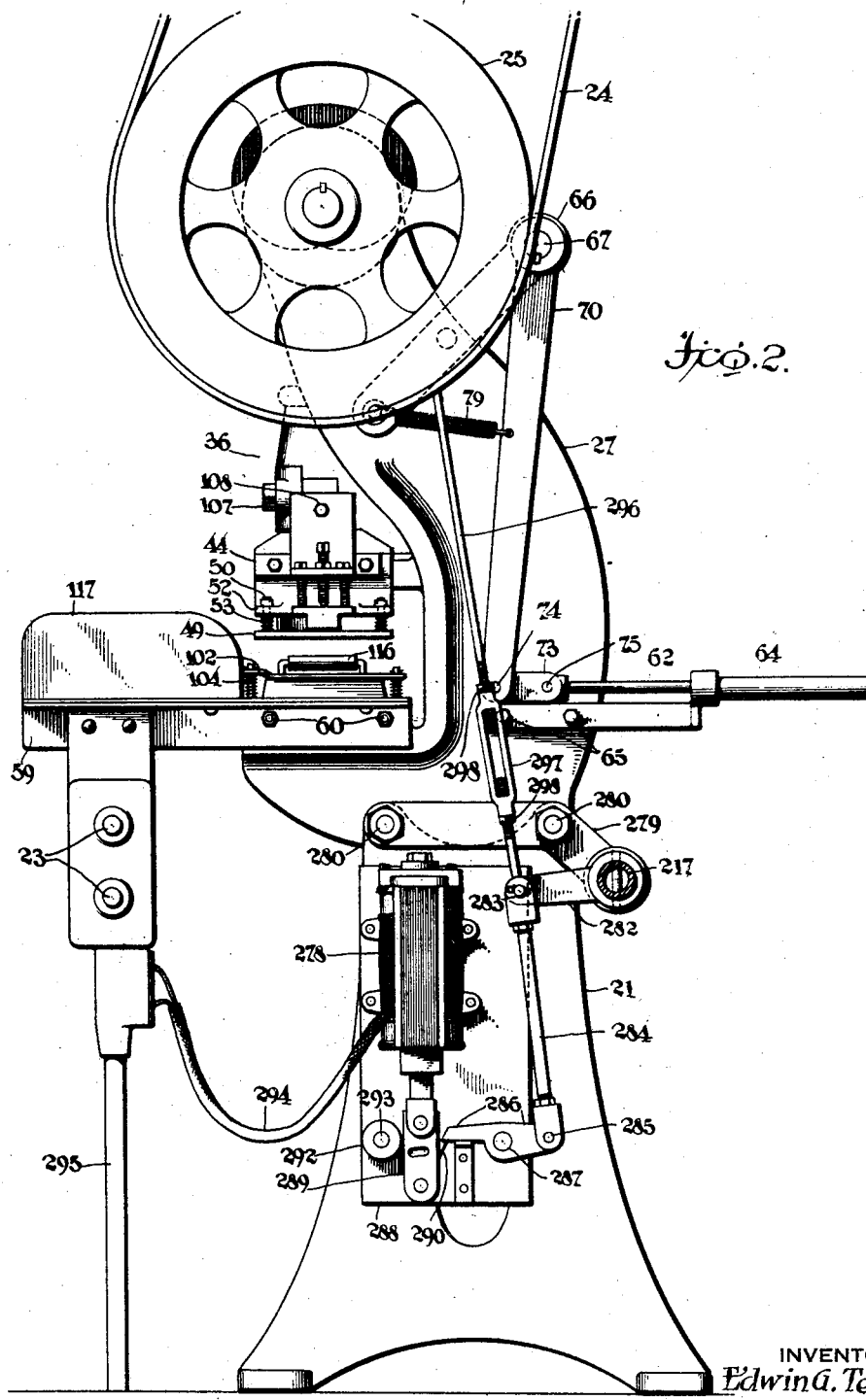
Fig. 2 is a side elevational view of a punch press and stamping mechanism forming a part of our invention.

One end of the rod 217 which is actuated in conjunction with the carriage 257, is journalled in a bracket 279, rigidly secured to the supporting members of the punch press by means of the usual nuts and bolts 280, as shown in Fig. 2. An arm 282 rigidly secured to the rod projects substantially horizontally therefrom and is provided with a bolt 283 for pivotally joining the arm to one end of a link 284. The other end of the link is pivoted on a bolt 285 extending through the end of a lever 286 mounted intermediate of its ends upon a pivot pin 287. The last named lever is adapted to be actuated by the solenoid 278 controlled by the switch 277 operated by the carriage, the solenoid being rigidly secured to a plate 288 carried by the supporting members 21 of the punch press. A vertically moving rod or bar 289 extending from the solenoid is provided with a lug 290 adapted to engage the end of the lever. The rod or bar is prevented from getting out of alinement by means of a roller 292 journalled upon a pin 293 carried by the plate. A suitable electrical conductor 294 connects the solenoid to the switch 277 on the cutting mechanism. The connection is of the conventional form enclosed in a tube 295 carrying other conductors of the electric system and does not require specific showing and description.

The end of the arm 282 is also pivotally connected to the lower end of a rod 296, which together with the link 284 and arm 282 is secured to the pivot bolt 283. The upper end of the rod is connected to the trip clutch 28 which operates in substantially the same manner and is composed of parts substantially equivalent to those of the clutch 216, illustrated in Fig. 10. As the clutch 216 has been described, it is not deemed necessary to go into a detailed description of one which operates in the same manner. The length of the rod may be varied by means of an adjustable turn-buckle 297 which is adapted to be locked in adjusted position by means of lock nuts 298. The trip clutch 28 is operated to turn the crank shaft 26 one revolution each time the solenoid is tripped and the bar 289 raised to bring the lug 290 against the bar 286. This action causes the operation of the punch press. The lever 29 illustrated in Fig. 1 is also adapted to trip the clutch by manually operating it at any time desired.

In order to obviate the possibility of the cutting edge 249 of the knife engaging the feed slide 197, we have provided a safety switch 299 which is closed only when the feed slide is in the position shown in Fig. 11, that is, at the limit of its backward movement. The switch mechanism 299 is so connected by means of wiring 300 to the electrical circuit communicating between the switch 277 and solenoid 278, that the circuit is broken as soon as the feed slide moves forward out of contact with the switch 299, to pull the flap to the take-away rollers 157 and 158. In case any of the mechanism should fail to operate in synchronism, the safety switch will prevent damage which might occur if the knife came in contact with the feed slide.

The carriage 257 is also provided with a plate or bar 302 secured thereto by means of bolts 303, being for the purpose of actuating a switch 304 which communicates with a tensioning device generally indicated by the numeral 305. The usual wiring, indicated at 306, provides operative communication between the switch 304 and a solenoid 307 carried by supporting arms 308 of the tensioning device.

Flap material which is rolled upon a conventional reel, (not shown) passes through the tensioning device and is guided through the punch press to the cutting mechanism. A platform 309, upon which the tensioning device is mounted, is provided with supporting legs 310 which are reinforced by a cross member 312, the supports 308 for the solenoid being secured to this platform. The top of the support is connected to the supporting members 21 of the punch press, as indicated at 313. The structure of the tensioning device includes a roller 314 rigidly secured to a shaft 315, the latter being journalled in a bearing 316. One end of the shaft is provided with a disc slip-clutch 317 and a flexible member 318 is secured at one end to the periphery of the slip clutch, and at the other end to a suspended weight 319. The flexible member 318, which may be in the form of a wire or chain is trained through an opening 320 in a bracket 322, the latter being rigidly secured at 323 to one of the supporting legs of the tensioning device. A small block 324 is secured to the flexible member immediately below the opening in the bracket 322 and is adapted to limit the upward movement of the flexible member. In order to maintain the weight in pre-determined suspended position, a chain 325 is also secured at one end to the periphery of the slip cultch and at the other end to a bolt 326 carried by the supporting arms 308. A second roller member 327 is journalled upon the end of a member 328, the latter being pivoted at 329 upon the bearing bracket 330 for the first roller. In order that the roller 327 may be moved slightly toward and away from the roller 314, we have provided a laterally extending arm 332 which is rigidly secured to the member 328 by means of suitable bolts 333. A weight 334 is suspended from the outer end of the arm upon a bolt 335. The bolt serves as a pivot for the arm, and an upright rod 336, also secured to the outer end of the arm, connects the arm to the solenoid 307.

The conventional form of wiring inclosed in a tubing 337 is connected to the solenoid and communicates with the switch member 304 which controls operation of the solenoid. When the solenoid is energized by actuation of the switch 304, the outer end of the arm 332 is drawn upwardly and the roller 327, pivoting about the bolt 329, is moved downwardly gripping the flap against the lower roller 314. While these rollers grip the flap, the carriage 257 moves forward a limited degree, thereby turning the roller 314 together with the slip clutch 317, thereby raising the weight 334 and permitting slack in the chain 325. The flap is thus tensioned by the weight until the carriage is drawn back to its normal position by the spring 272. Movement of the carriage rearwardly releases the switch 277 which in turn breaks the electrical connection to the solenoid 307 and the roller 327 is caused to release its pressure upon the roller 314. The weight 319 is maintained in proper position and prevented from falling to the floor by the chain 325, when the electric circuit is broken.

A slotted bar 338 secured to a bracket 339 by means of bolts and nuts 340 serves as an adjustable support for a pair of small rollers 342 secured to the upper end of the bar and adapted to guide the flap between the rollers 314 and 327. Additional rollers 343 mounted on the support 59 adjacent the tensioning device forwardly thereof, are adapted to guide the flap material to the punch press.

In order that any desired length of flap may be cut from the strip as it is taken from a roll of flap material, the entire cutting mechanism is so mounted that it may be adjusted bodily in a horizontal direction toward and away from the punch press. To facilitate this adjustment the base member 125 is provided with a pair of guide surfaces 344 and 345 and the lower portion of the frame is provided with co-operating sliding surfaces 346 and 347. The frame may be moved along the guide surfaces by turning a hand wheel 348, having an operating handle 348$^a$, keyed to a threaded shaft 349 of the base and the other end is journalled in a bearing 350 secured to the base member. A bracket 352 integral with or rigidly secured to lower part of the frame member 126 is disposed adjacent the middle portion of the frame and is provided with a threaded opening 353 through which the shaft extends.

Two brackets 355 and 356 are secured to the base member by means of bolts 357 and are adapted to support a graduated scale 358 which is designed to indicate the length of the flap to be cut. To aid in setting the machine for a certain length of flap a pointer 359 secured to the frame 126 moves along the scale as the frame is adjusted.

In order to make provision for the movement of the frame 126 with respect to the punching mechanism and the motor, the shaft 136 which is connected to the motor, is provided with a groove 360 which co-operates with a key in the gear wheels 139 and 210. Likewise, the rod 217, composed of two telescoping members 362 and 363, is connected to the cutting mechanism and punch press. The one member 362 is provided with a groove 364 and makes a spline connection with the other member 363 which is in the form of a tube, the latter being provided with rivets or bolts 365 which are adapted to co-operate with the groove.

In the operation of our machine, a roll of flap material is placed upon a reel or other suitable similar device adjacent the tensioning mechanism and the end of the flap material is trained between the tensioning rolls 314 and 327. It is then guided under the small rollers 343 and 116 secured to the punching press and rests upon the guards 102. The first punching operation is accomplished by tripping the lever 29 by hand, which punches openings and shears off the edges of the flap 105. The edges of the flap are sheared toward the center line and the two openings are punched, one on each side of the sheared portion, as illustrated by the shape of the die, shown in Fig. 4, one of the openings being in the form of an elongate slot, indicated at 270 in Fig. 8. The operator then manually draws the flap through the machine over the top of the table 120 and guides it between the rollers 259 and 260 of the carriage until the slot 270 of the flap engages the lug 263 upon the carriage. The carriage is then pushed forwardly until the bracket 276 engages the switch member 277 and the forward end of the carriage comes in contact with the abutment 252. From this moment the operation of the machine is automatic and continuous until the supply of material is exhausted from the reel.

As soon as the electrical circuit controlled by the switch member 277 is completed, the switch being in communication with the solenoid 278 upon the punch press, the lever 286 connected to the trip clutch is actuated and causes the punch press and printing mechanism to operate. It will be seen from this description that the length of each finished flap depends upon the distance between the die of the punch press and the knife of the cutting mechanism.

When the solenoid 278 is energized, the link 284 actuates the arm 282 of the rod connecting the cutting mechanism and the punch press and in turn the rigid arm 219 engages the end of the lever 220 which releases the lug 225 on the clutch and allows the shaft 213 to rotate one revolution. The sprocket chain connections 228 and 234 from the shaft to the knife 245 of the cutting device causes the flap to be severed at the point where it is sheared toward its center. When the edge of the knife moves downwardly, the arm 243 also moves downwardly and the finger 244 at the end of the arm engages the rear end of the lug 263 on the carriage releasing the latter from the elongate opening 270 in the flap. The forward end of the opening hooks over the lug 208 upon the feed slide at the time the knife moves downwardly.

When the shaft 213 has completed slightly over one-half revolution and the knife edge has begun to travel upwardly, the lug 254 upon the end of the shaft engages the switch member 255 and trips the solenoid 178 to actuate the bar 186 downwardly. This operation releases the arm of the trip clutch 174 and allows the disc 193 to make one revolution. The position of the disc before it is actuated is indicated in Fig. 11. As soon as the clutch, together with the shaft 175, rotates, it will be seen that the feed slide 197 moves forwardly together with the lug 208 which has engaged the opening in the flap and draws the flap forwardly until the severed end engages the take-away rollers 157 and 158. There is sufficient distance between the end of the slot 270 in the flap where the lug engages it and the severed end of the flap to permit the rollers to grip the latter without interfering with the slide.

The take-away rollers 157 and 158 are adapted to operate to continue drawing the flap material through the machine as they are operatively connected to the drive shaft 136 from the motor by means of sprocket chain gearing, above described. When the flap material is drawn through the machine by the take-away rollers until the portion, which was punched when the carriage was first moved forwardly to trip the solenoid 278, the next elongate slot engages the lug 263. The force applied to the flap material in its forward movement by the take-away rollers is sufficient against the lug to move the carriage forward until it is stopped by the abutment 252. At this time the bracket 276 is also engaging the switch mechanism 277. These contacts being made, the cutting operation is repeated as above described. While the carriage is temporarily stopped, the take-away rollers 157 and 158 still tend to draw the material through the machine but the frictional resistance of the slip clutch 145 is overcome and the take-away rollers are stopped until the flap is severed. As soon as the flap is severed, the clutch 145 causes the rollers to continue rotation, the carriage is drawn back to normal position by means of the spring 272 and the next cycle of operation is begun.

In order that all the flaps cut may be of uniform length and to prevent sagging or wrinkling of the flap material 105, as it travels through the machine, the tension rollers 314 and 327 grip the material momentarily just before it is severed and during the severing operation, so that it is properly tensioned. This is accomplished by operation of the solenoid 307 which is controlled by the switch member 304 adapted to contact with the carriage immediately after it starts its forward movement and remains in contact until the carriage is retracted to normal position. As soon as the carriage engages the switch member, the solenoid 307 is energized, the end of the arm 332 is moved upwardly, and the roller 327 moved downwardly thereby gripping the flap between the rollers. The remainder of the forward movement of the carriage applies increased tension to the flap material and winds the flexible member 318 upon the slip clutch against force of the weight, tension on the chain 325 being relieved. As soon as the carriage is retracted, the gripping action of the rollers is relieved, the chain becoming taut to suspend the weight.

Although we have illustrated but one form which our invention may assume and have described in detail but a single application thereof, it will be apparent to those skilled in the art that it is not so limited, but that various minor modifications and changes may be made therein without departing from the spirit of our invention or from the scope of the appended claims.

What we claim is:

1. A power driven machine comprising means for conveying a strip of flexible material therethrough, means for simultaneously punching and stamping the strip at regular predetermined intervals as it passes through the machine and means actuated in response to the movement of the strip for severing the strip adjacent the punched portions.

2. A power driven machine comprising means for conveying a strip of flexible material therethrough, means for punching and stamping the material at predetermined intervals and intermittently operable means actuated by movement of the strip for severing the material adjacent each punched portion, said punching means and severing means being so associated as to be operated simultaneously.

3. A machine comprising mechanism for conveying a flexible strip therethrough, means for punching and stamping the strip at regular predetermined intervals, mechanism for severing the strip adjacent each punched portion subsequent to the punching thereof, a plurality of electrically energized devices interconnecting all of said means to control operation thereof, means operable by movement of the flexible strip to energize the electrical devices and means for bodily adjusting the mechanism toward and away from the punching means.

4. A machine comprising means for conveying a flexible strip therethrough, means for punching and stamping the strip at regular predetermined intervals, a resiliently mounted carriage for temporarily arresting the travel of the strip while it is being punched and means actuated by the carriage for increasing the tension on the strip while it is arrested.

5. A machine comprising means for conveying a flexible strip therethrough, means for punching and stamping the strip at predetermined intervals, mechanism provided with means for temporarily arresting the travel of the strip while it is being punched and a tensioning device controlled by the mechanism for increasing the tension on the strip while it is being punched.

6. A machine comprising means for conveying a flexible strip therethrough, means for punching the strip at predetermined intervals including a rotatable shaft, a cam secured to the shaft a type holder for marking the strip and means actuated by the cam for moving the type holder to a position adjacent the punching means.

7. A machine comprising means for conveying a flexible strip therethrough, means for punching the strip at predetermined intervals including a rotatable shaft, a cam secured to the shaft and stamping mechanism for marking the strip provided with a type holder means actuated by the cam for moving the type holder to a position adjacent the punching means and means for stopping the holder while the punching and stamping operations occur simultaneously.

8. A machine comprising means for conveying a flexible strip therethrough, means for punching the strip at predetermined intervals, a rotatable shaft, a cam secured to the shaft, stamping mechanism actuated by the cam as the shaft is rotated for marking the strip adjacent the punched portions and a pad secured to the punching means, adapted to be pressed against the strip as it is being stamped.

9. A machine comprising means for conveying a flexible strip therethrough, means for punching the strip at predetermined intervals, including a rotatable shaft, a cam secured to the shaft, stamping mechanism actuated by the cam as the shaft is rotated for marking the strip adjacent the punched portions and a yielding adjustable pad secured to the punching means adapted to be pressed against the strip as it is being stamped.

10. A machine comprising means for conveying a flexible strip therethrough, means for punching the strip at predetermined intervals including a shaft, a cam secured to the shaft, a stamping mechanism including a lever secured to the punching means and engaging the cam and a sliding carrier provided with a type holder and an inking plate adapted to be actuated by the lever to bring the type in position to stamp the strip when the latter is punched.

11. A machine comprising means for conveying a flexible strip therethrough, means for punching the strip at predetermined intervals including a shaft, a cam secured to the shaft, stamping mechanism including a lever secured to the punching means and engaging the cam, a sliding carrier provided with a type holder and an inking plate adapted to be actuated by the lever to bring the type in position to stamp the strip when the latter is punched and stationary inking rolls adapted to contact with the type and plate.

12. A machine comprising means for conveying a flexible strip therethrough, means for punching the strip at predetermined intervals including a rotatable shaft, a cam secured to the shaft, a pair of stamping mechanisms arranged adjacent the punching means, said cam being adapted to operate both stamping mechanisms to mark the strip at either side of each punched portion.

13. A machine comprising means for punching and stamping a flexible strip, mechanism including means for drawing a strip through the machine, a member having means adapted to engage by operation of the machine an opening punched in the strip to momentarily stop the latter and means for disengaging the means on the member from the opening.

14. A machine comprising means for punching and stamping a flexible strip, mechanism including means for drawing the strip through the machine, a carriage formed with a lug thereon adapted to enter an opening punched in the strip whereby the carriage is moved against a stationary part of the mechanism and stopped, and means for disengaging the lug from the opening.

15. A machine comprising means for punching and stamping a flexible strip, cutting mechanism including means for drawing the strip through the machine, a carriage formed with a lug thereon adapted to enter an opening punched in the strip whereby the carriage is moved against a stationary part of the mechanism, means for disengaging the lug from the opening and means for retracting the carriage to normal position.

16. A machine comprising means for punching a flexible strip, cutting mechanism including means for drawing the strip through the machine, a carriage formed with a lug thereon adapted to enter an opening punched in the strip whereby the cariage is moved against a stationary part of the mechanism and is stopped, means for disengaging the lug from the opening and a spring for retracting the carriage to normal position.

17. A machine comprising means for punching a flexible strip, cutting mechanism including driven roller members for drawing the strip through the machine, a carriage formed with a lug thereon adapted to enter an opening punched in the strip whereby the carriage is moved against a stationary part of the mechanism and stopped, means for disengaging the lug from the opening, a cutting edge for severing the strip while it is stopped and means for moving the strip into engagement with the rollers after it has been severed.

18. A machine comprising means for punching a flexible strip, mechanism including driven rollers for drawing the strip through the machine, a carriage formed with a lug thereon adapted to enter an opening punched in the strip whereby the carriage is moved against a stationary part of the mechanism and stopped, means for disengaging the lug from the opening, a cutting edge for severing the strip while it is stopped and a second carriage formed with a lug adapted to enter the opening co-incident with the disengagement of the first named lug therefrom, the second named carriage being adapted to move the end of the strip remaining after the latter is severed into engagement with the rollers.

19. A machine comprising means for punching a flexible strip, mechanism including driven rollers for drawing the strip through the machine, a carriage formed with a lug thereon, adapted to enter an opening punched in the strip whereby the carriage is moved against a stationary part of the mechanism and stopped, friction means associated with the rollers, the frictional resistance being overcome and the roller stopped when the carriage stops.

20. A machine comprising means for punching a flexible strip, mechanism including rollers for drawing the strip through the machine, a carriage formed with a lug thereon, the latter being adapted to enter an opening punched in the strip whereby the carriage is moved against a stationary part of the mechanism and stopped, and a frictional drive operatively connected to the rollers for rotating them, the resistance offered by the strip while it is stopped being sufficient to overcome the frictional resistance of the friction drive to stop rotation of the rollers.

21. A machine comprising means for punching a flexible strip, mechanism including rollers for drawing the strip through the machine, a carriage formed with a lug thereon, the latter being adapted to enter an opening punched in the strip whereby the carriage is moved against a stationary part of the mechanism and stopped, a driven mechanism provided with friction plates operatively connected to the rollers for rotating the latter, the resistance offered by the strip while it is stopped being sufficient to overcome the frictional resistance of the plates thereby stopping rotation of the rollers.

22. A machine comprising means for punching a flexible strip, rollers for drawing the strip through the machine, a carriage adapted to engage the strip to stop its travel temporarily, a driven crank arm provided with a cutting member adapted to sever the strip while it is stopped and means for feeding the strip to the rollers after it has been severed.

23. A machine comprising means for punching a flexible strip, mechanism including driven rollers for drawing the strip through the machine, means formed with a lug for positively engaging a punched portion of the strip to stop movement thereof, means for severing the strip, means for disengaging the lug from the punched portion and a member formed with the projection adapted to engage the punched portion coincidently with the disengagement of the lug, the member operable to move said punched portion of the strip into engagement with the rollers.

24. A flap machine comprising means for advancing a continuous strip of flap material, means for punching the strip, and a resiliently mounted member engaged by a perforation in the strip for opposing the operation of the first means.

25. A flap machine comprising means for advancing a continuous strip of flap material, means for punching the strip, a resiliently mounted member engaged by a perforation in the strip for opposing the operation of the first means and a control element engaged by the member for initiating the operation of the punching means.

26. A flap machine comprising means for advancing a continuous strip of material, means for punching the strip, a shearing device for severing the strip into predetermined lengths and means controlled by the strip for operating the punching means and the device simultaneously.

27. A flap machine comprising means for punching a strip of material, a member mounted upon a carriage for engaging a perforation of the strip and means engaged by the carriage for initiating the operation of the first means.

28. A machine comprising means for conveying a flexible strip of material therethrough, means for punching the strip, means associated with the latter means for cutting the strips, and means engaging the punched portions to control the cutting means.

29. A machine comprising means for conveying a flexible strip of material therethrough, means for punching the strip, means associated with the latter means for transversely cutting the strip, means engaging the punched portions of the strip to control the operation of the cutting means, and means for varying the spacing between the punching means and the cutting means.

30. A machine comprising means for conveying a flexible strip therethrough, means for severing the strip at regular predetermined intervals, and means operatively interconnected with the severing means for automatically but temporarily applying tension to the strip while the latter is being severed.

31. A machine comprising means for conveying a flexible strip therethrough, means for punching the strip at regular predetermined intervals, mechanism for severing the strip adjacent each punched portion subsequent to the punching thereof, and means operatively interconnected with the severing means for automatically increasing the tension on the strip while it is being severed.

32. A machine comprising means for punching a flexible strip at predetermined intervals, means controlled by the punched portions to feed the strip, means for severing the strip, a pair of power driven rollers, and means for moving the strip into engagement with the rollers, the latter drawing the strip through the machine.

33. A machine for punching and severing continuous strips of flexible material at predetermined intervals comprising a device for punching portions from the strip, a severing device associated therewith, means for feeding the strip from the punching device to the severing device, and means engaging the punched portions for synchronously operating both the punching and severing devices.

In witness whereof, we have hereunto signed our names.

EDWIN G. TEMPLETON.
WILLIAM K. GLENNON.